Figures 1, 2:
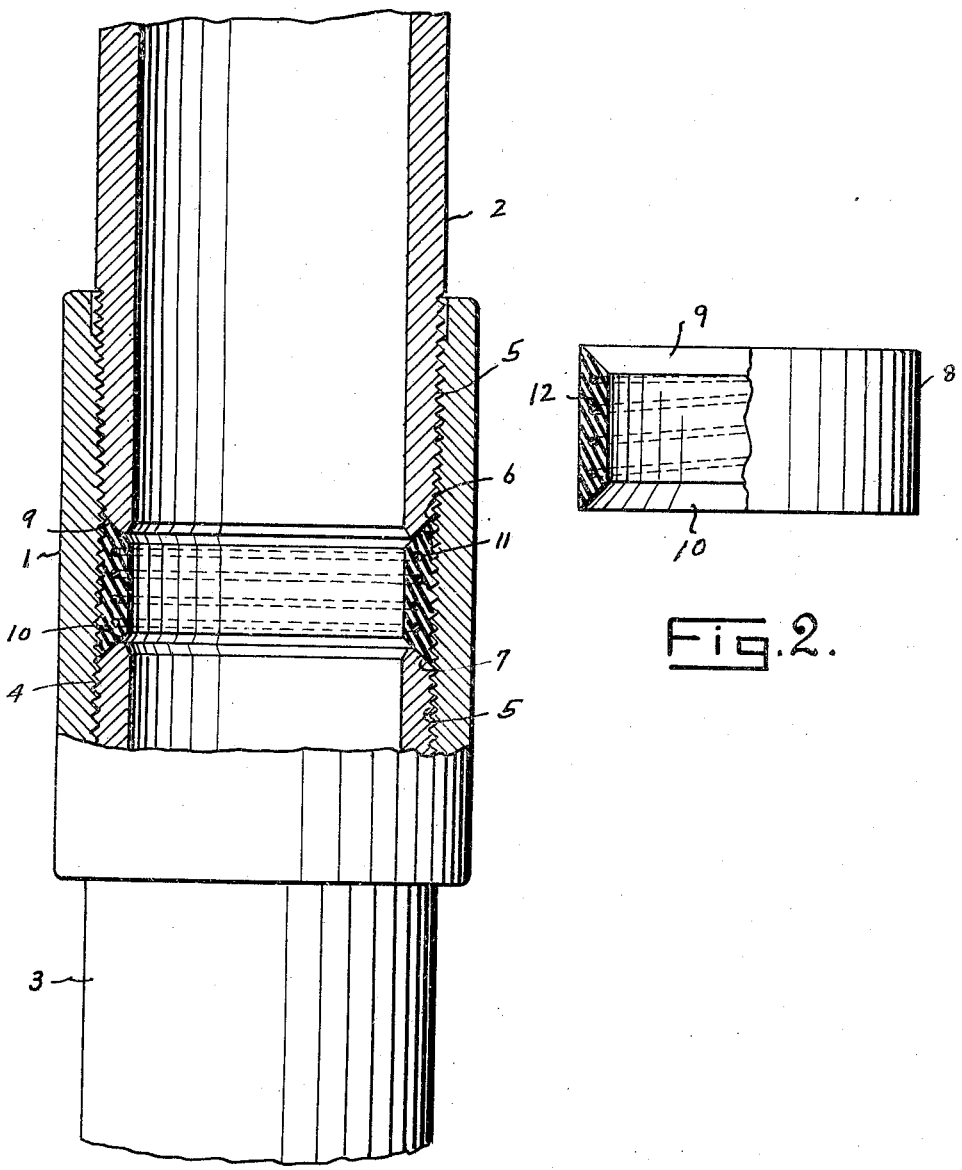

Nov. 8, 1949     L. D. HILTON     2,487,241
THREAD SEAL AND BUFFER GASKET FOR PIPE COUPLINGS
Filed Jan. 16, 1947

Inventor
Lewis D. Hilton
By E. V. Hardway
Attorney

Patented Nov. 8, 1949

2,487,241

UNITED STATES PATENT OFFICE 2,487,241

THREAD SEAL AND BUFFER GASKET FOR PIPE COUPLINGS

Lewis D. Hilton, Houston, Tex.

Application January 16, 1947, Serial No. 722,412

4 Claims. (Cl. 285—157)

This invention relates to a pipe coupling and has more particular relation to a thread seal and buffer gasket for such coupling.

An object of the present invention is to provide a seal ring, or gasket, which will fit into and fill the gap between the ends of pipe sections which are connected by an external coupling.

Another object of the invention is to provide a coupling of the character described which includes said seal ring or gasket clamped between the opposing ends of adjacent pipe sections and which is formed of resilient material so that upon the application of endwise compressive force to the gasket will flow into the threads of the coupling and form a fluid tight seal with the coupling and with the pipe ends, to prevent leakage.

It is another object of the invention to provide, in a coupling of the character described, a resilient gasket or seal ring which is reinforced so that the gasket will not be liable to be deformed by said endwise compressive force applied thereto or by the pressure of liquid exerted either against the interior or the exterior of the seal ring.

It is a further object of the invention to provide, in a pipe coupling, an annular gasket, or seal ring, which when fitted between the opposing ends of adjacent pipe sections will be substantially flush with the inner surface of the sections so that tubing or pipe equipped with said gaskets will have an approximately continuous smooth interior.

The type of coupling herein described has been specially designed for use in oil wells although it is obvious it is capable of general use for sealing within pipe couplings.

Standard pipe couplings in common use are internally threaded and are slightly flared from the longitudinal center of the coupling toward each end and the adjacent ends of the pipe sections are slightly tapered to conform to the corresponding flare of the coupling and are externally threaded to be screwed into the coupling ends and when fully screwed home the facing ends of the pipe sections are spaced apart thus leaving an annular gap. This gap sets up a turbulence in liquid flowing through the line. This liquid often flows under high pressure and usually contains corrosive elements and abrasive material which, at the points of turbulence, erode away the coupling so as to weaken, and sometimes completely sever, the coupling and, at least, causing corrosion and thread leakage. If equipped with the seal ring, or gasket, herein described, this damage from abrasion and corrosion will be eliminated or greatly reduced.

The elimination of the annular gap in the coupling between opposing pipe ends, by eliminating the turbulence, will cause increased volumetric efficiency in the flow line.

It is also advantageous to provide a well pipe having an approximately continuous smooth interior so that in swabbing a tubing or casing in the well the customary slippage of fluid as the swab passes through a coupling will be eliminated and the wear on the swab will be reduced.

It is further to be noted that in a flow tubing, or pump tubing, leakage through the couplings, even though slight will cause a corrosive action to be set up with the result that the threads begin to disintegrate and the leakage condition soon develops to such an extent that production is materially reduced. For that reason it is desirable to equip each coupling with the seal ring, or gasket, herein described so that leakage conditions will not develop.

Other objects and advantages will be apparent from the following description which is illustrated by the accompanying drawings wherein:

Figure 1 is a side elevation, partly in section, showing the gasket, with one type of reinforcement, installed and, Figure 2 is a side view, partly in section, of a slightly modified form of the gasket.

Referring now more particularly to the drawings wherein like numerals of reference designate the same parts in each of the figures, the numeral 1 designates an outside coupling connecting adjacent sections 2 and 3 of the string of pipe. This string may be either a flow tubing, a casing or other pipe for the flow of fluid.

The coupling is provided with the internal threads 4 and it will be noted that these threads are slightly flared, each way, from the transverse central line of the coupling toward the respective ends thereof.

The adjacent ends of the sections 2 and 3 are externally tapered to conform to the flare of the ends and are provided with external threads, as 5, to be screwed into the coupling.

When the sections are screwed home their opposing ends will be spaced apart forming an annular gap within the coupling. These facing ends are tapered inwardly thus providing the opposing tapering faces 6 and 7.

There is a seal ring, or gasket, 8 whose ends are flared forming the inside tapering faces 9 and 10 to contact with the corresponding faces 6 and 7.

This gasket is formed of resilient material of the required toughness and strength. It is of such composition that it will not deteriorate in the presence of oil, gas or other corrosive elements.

In assembling the coupling 1 with the adjacent pipe sections 2 and 3 the gasket 8 is first inserted into the coupling 1 and when the adjacent sections 2 and 3 are screwed home the faces 6, 7 will contact the faces 9, 10 and apply a compressive force to the gasket, or seal ring, forming fluid tight seals between said contacting faces and also causing the material of the gasket to flow into the opposing threads of the coupling 1 to provide an absolutely fluid tight joint.

When the gasket is installed and the compressive force is applied thereto its inside diameter will be substantially the same as the inside diameter of the line sections 2 and 3 so that the line will have an approximately continuous, smooth, interior with the advantages hereinabove set out.

In some cases the pressure of fluid flowing through the line will be greater than the outside pressure and in such case the couplings protected by the gaskets 8 will be leak proof, not allowing the escape of fluid outwardly through the couplings; however, in some instances the pressure of the fluid in a well on the outside of the line may be greater than that on the inside of the line so that in case of leakage past the threads the gasket will be subjected to the outside pressure. In such case it is desirable that the gasket be reinforced to prevent distortion thereof, and leakage. Any suitable type of reinforcement may be used.

As illustrated in Figure 1, there are the metal reinforcing rings 11 embedded in the material of the gasket and spaced the required distance apart. However, in the form illustrated in Figure 2, there is a single spiralled reinforcement 12, preferably formed of metal, and embedded in the gasket. Either form of reinforcement may be advantageously used. This reinforcement will prevent distortion of the gasket either from the endwise compressive force exerted by the facing ends of the sections 2 and 3 or by outside fluid pressure exerted against the gasket.

The drawings and description are illustrative merely while the broad principle of the invention will be defined by the appended claims.

What I claim is:

1. The combination with a tubular coupling and tubular sections whose adjacent ends are screwed into the respective ends of the coupling, said adjacent ends being spaced apart when screwed home, of a resilient, sleeve-like, gasket in the coupling of a maximum wall thickness substantially equal to the maximum wall thickness of said adjacent ends, said gasket ends abutting the said adjacent ends of said tubular sections.

2. The combination with a tubular coupling and tubular sections whose adjacent ends are screwed into the respective ends of the coupling, said adjacent ends being spaced apart when screwed home and also being formed with annular, tapering faces which converge inwardly with respect to each other, of a resilient, sleeve-like, gasket in the coupling whose ends are formed with annular outwardly flared faces which abut said respective tapering faces and whose external surface is substantially flush with the external surface of the adjacent ends of the tubular sections.

3. The combination with a tubular, internally threaded coupling and tubular members having ends threaded into the respective ends of the coupling and spaced apart, of a resilient, sleeve-like, gasket within the coupling between said spaced ends and subjected to endwise compressive force thereby when said ends are screwed home the external and internal surfaces of the gasket being substantially of the same transverse external and internal diameters, respectively, as the external and internal diameters of the tubular members.

4. The combination with a tubular, internally threaded, coupling and tubular members having ends threaded into the respective ends of the coupling and spaced apart, said ends presenting annular faces which diverge radially outwardly, of a resilient, sleeve-like, gasket within the coupling between said end faces and having annular, flared end faces which abut said outwardly diverging faces, said gasket being subjected to the endwise compressive force of said tubular members when the latter are screwed home to form fluid-tight seals between said contacting faces and with the inside of the coupling the threaded ends of the tubular members being of substantially the same radial wall thickness as the radial wall thickness of the gasket.

LEWIS D. HILTON.

REFERENCES CITED

The following references are of record in the file of this patent:

UNITED STATES PATENTS

| Number | Name | Date |
|---|---|---|
| 262,581 | Doolittle | Aug. 15, 1882 |
| 304,276 | Newell | Aug. 26, 1884 |
| 906,225 | Harrison | Dec. 8, 1908 |
| 2,385,156 | Newell | Sept. 18, 1914 |